(12) United States Patent
Klingenbrunn et al.

(10) Patent No.: US 8,898,448 B2
(45) Date of Patent: Nov. 25, 2014

(54) HARDWARE ACCELERATION FOR WWAN TECHNOLOGIES

(75) Inventors: Thomas Klingenbrunn, San Diego, CA (US); Uppinder S. Babbar, San Diego, CA (US); Vanitha A. Kumar, San Diego, CA (US); Vikas Nagpal, San Diego, CA (US); Sriram Narayan, San Diego, CA (US); Samson Jim, San Diego, CA (US); Shailesh Maheshwari, San Diego, CA (US); Marcello V. Lioy, San Diego, CA (US); Mathias Kohlenz, San Diego, CA (US); Idreas Mir, San Diego, CA (US); Irfan A. Khan, Brooklyn, NY (US); Gurvinder S. Chhabra, San Diego, CA (US); Jean-Marie QD Tran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1090 days.

(21) Appl. No.: 12/487,576

(22) Filed: Jun. 18, 2009

(65) Prior Publication Data

US 2009/0316904 A1     Dec. 24, 2009

Related U.S. Application Data

(60) Provisional application No. 61/074,099, filed on Jun. 19, 2008.

(51) Int. Cl.
*H04L 29/06* (2006.01)
*H04W 12/02* (2009.01)
(Continued)

(52) U.S. Cl.
CPC .......... *H04W 12/02* (2013.01); *H04L 2209/26* (2013.01); *H04L 47/10* (2013.01); *H04L 9/065*
(Continued)

(58) Field of Classification Search
CPC . H04L 63/0428; H04L 63/068; H04L 9/0891; H04L 9/12
USPC ........................................................ 713/150
See application file for complete search history.

(56) References Cited

U.S. PATENT DOCUMENTS 6,434,620 B1  8/2002  Boucher et al.
6,870,932 B2  3/2005  Jiang
(Continued)

FOREIGN PATENT DOCUMENTS

CN  1633762 A  6/2005
CN  101170392 A  4/2008
(Continued)

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 8)" Internet Citation May 31, 2008, XP002556378 [retrieved on May 31, 2008] paragraph [0002] paragraph [0004]-paragraph [5.5.2.1].

(Continued)

*Primary Examiner* — Arvin Eskandarnia
(74) *Attorney, Agent, or Firm* — Ashish L. Patel

(57) ABSTRACT

Systems and methods for wireless communications are provided. These include data deciphering components, interrupt processing components, adaptive aggregations methods, optimized data path processing, buffer pool processing, application processing where data is formatted in a suitable format for a destination process, and Keystream bank processing among other hardware acceleration features. Such systems and methods are provided to simplify logic designs and mitigate processing steps during wireless network data processing.

10 Claims, 12 Drawing Sheets

(51) Int. Cl.
*H04L 12/801* (2013.01)
*H04L 9/06* (2006.01)
*H04L 12/861* (2013.01)
*H04W 80/02* (2009.01)

(52) U.S. Cl.
CPC ....... (2013.01); *H04W 80/02* (2013.01); *H04L 63/0457* (2013.01); *H04L 49/90* (2013.01); *H04L 2209/80* (2013.01); *H04L 2209/122* (2013.01)
USPC ............ 713/150; 380/274; 380/270; 726/22; 370/394

(56) References Cited

U.S. PATENT DOCUMENTS

| | | | |
|---|---|---|---|
| 6,987,961 | B1 | 1/2006 | Pothana |
| 7,089,326 | B2 | 8/2006 | Boucher et al. |
| 7,596,628 | B2 | 9/2009 | Aloni et al. |
| 7,627,113 | B2 | 12/2009 | Surendran et al. |
| 2006/0252413 | A1 | 11/2006 | Ikeda |
| 2006/0282737 | A1* | 12/2006 | Shi et al. ............... 714/746 |
| 2007/0010290 | A1 | 1/2007 | Iida et al. |
| 2007/0011358 | A1 | 1/2007 | Wiegert et al. |
| 2007/0130637 | A1 | 6/2007 | Sarreal et al. |
| 2008/0101609 | A1* | 5/2008 | Jiang ..................... 380/274 |
| 2008/0123655 | A1* | 5/2008 | Kim et al. .............. 370/394 |
| 2008/0137574 | A1* | 6/2008 | Jiang ..................... 370/310 |

FOREIGN PATENT DOCUMENTS

| | | |
|---|---|---|
| DE | 19640526 | 4/1998 |
| EP | 0912015 | 4/1999 |
| EP | 1343282 A1 | 9/2003 |
| EP | 1691288 A2 | 9/2003 |
| EP | 1406424 A2 | 4/2004 |
| EP | 1722516 A1 | 11/2006 |
| EP | 1928130 A2 | 6/2008 |
| GB | 2426673 | 11/2006 |
| JP | 01122229 | 5/1989 |
| JP | 2004304636 A | 10/2004 |
| JP | 2006087097 A | 3/2006 |
| JP | 2006295505 A | 10/2006 |
| JP | 2007060365 A | 3/2007 |
| JP | 2008118649 A | 5/2008 |
| JP | 2008516538 A | 5/2008 |
| WO | WO9633564 A1 | 10/1996 |
| WO | 2006044967 A1 | 4/2006 |
| WO | WO2007130637 | 11/2007 |

OTHER PUBLICATIONS

International Search Report & Written Opinion—PCT/US2009/048048, International Search Authority—European Patent Office—May 20, 2010.

Partial International Search Report—PCT/US2009/048048, International Search Authority—European Patent Office—Jan. 26, 2010.

3GPP TS 36.323 V8.2.1, May 2008, 5.3 Ciphering and deciphering, 6.3.5 COUNT.

3GPP TS 36.331 V8.1.0, Mar. 2008, 5.3 Connection control.

He, et. al., "AIDA: Adaptive Application-Independent Data Aggregation in Wireless Sensor Networks," ACM Transactions, vol. 3, No. 2, May 2004, XP040004046, abstract, pp. 426-457.

* cited by examiner

HARDWARE ACCELERATION FOR WWAN TECHNOLOGIES

CLAIM OF PRIORITY UNDER 35 U.S.C. §119

This application claims the benefit of U.S. Provisional Patent Application No. 61/074,099, entitled HARDWARE ACCELERATION FOR WWAN TECHNOLOGIES, and filed on Jun. 19, 2008, the entirety of which is incorporated herein by reference.

BACKGROUND

I. Field

The following description relates generally to wireless communications systems, and more particularly to hardware acceleration for wireless wide area networks.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

As wireless systems become more complex with added features and capabilities being implemented in the handsets, there has been a rising need for increasing the performance of the hardware resident on the handsets or mobile devices. Specifically, with respect to wireless networks such as wireless wide area networks (WWAN) and associated devices, there is a need to increase processing speed and memory performance of the devices while mitigating network latencies due to underperforming components on the network.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods provide hardware acceleration features for enhancing the performance of components operating on networks such as Wireless Wide Area Networks (WWAN), for example. In one aspect, internal processing such as data deciphering is performed before copying results of the deciphering to external memory in order to minimize processing operations. Another aspect includes adaptive or dynamic data aggregation and interrupt processing in order to facilitate processing performance. In another hardware acceleration aspect, data path processing optimization is provided via different hardware paths, either where data deciphering is decoded in a buffer before moving to external memory, or by performing deciphering directly in external memory. At any given point the hardware path is dynamically selected depending on the specific scenario. In either case, hardware is simplified and processing performance enhanced by reducing the number of operations and logic involved.

In yet another aspect, buffer pool components are provided that enable data processing to occur at less frequent intervals and/or at periods when the resident processor is not as busy thus saving performance bandwidth for busier processing times. In still yet another acceleration aspect, application processors prepare data in a format suitable by a destination processor or process. This mitigates the need for the destination processor to transform such data into a suitable processing format for the respective destination. In yet another aspect, keystream processing components are provided where various parameters and data values can be derived from other parameters rather than having to be regenerated anew each time. Such processing derivations further enhance performance of hardware accelerators.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Various systems and methods are provided for increasing the hardware performance of a wireless system. As an example, one method and system is to decipher data before moving to external memory and handling contingencies for the case where invalid deciphering parameters were used. Another method and system is to reduce interrupts by adaptive aggregation length and priority queues for minimizing interrupt overhead while maintaining low latencies for delay sensitive data. Another method and system is to use at least two optimized data paths for reducing data copies in Wireless Wide Area Network (WWAN) protocol stacks. Another method and system is to provide a buffer pool mechanism to enable software to provide data buffers to hardware in an efficient manner and means to avoid cache pollution. Another method and system is to have the network driver interface specification (NDIS) data buffers prepared by an application processor to avoid extra copying. And yet another method and system is to have a Keystream bank generated by hardware to enable the software to perform deciphering thereby reducing delay, avoiding extra data copy, and reduce software processing for preparing decipher tasks.

Figure 1:
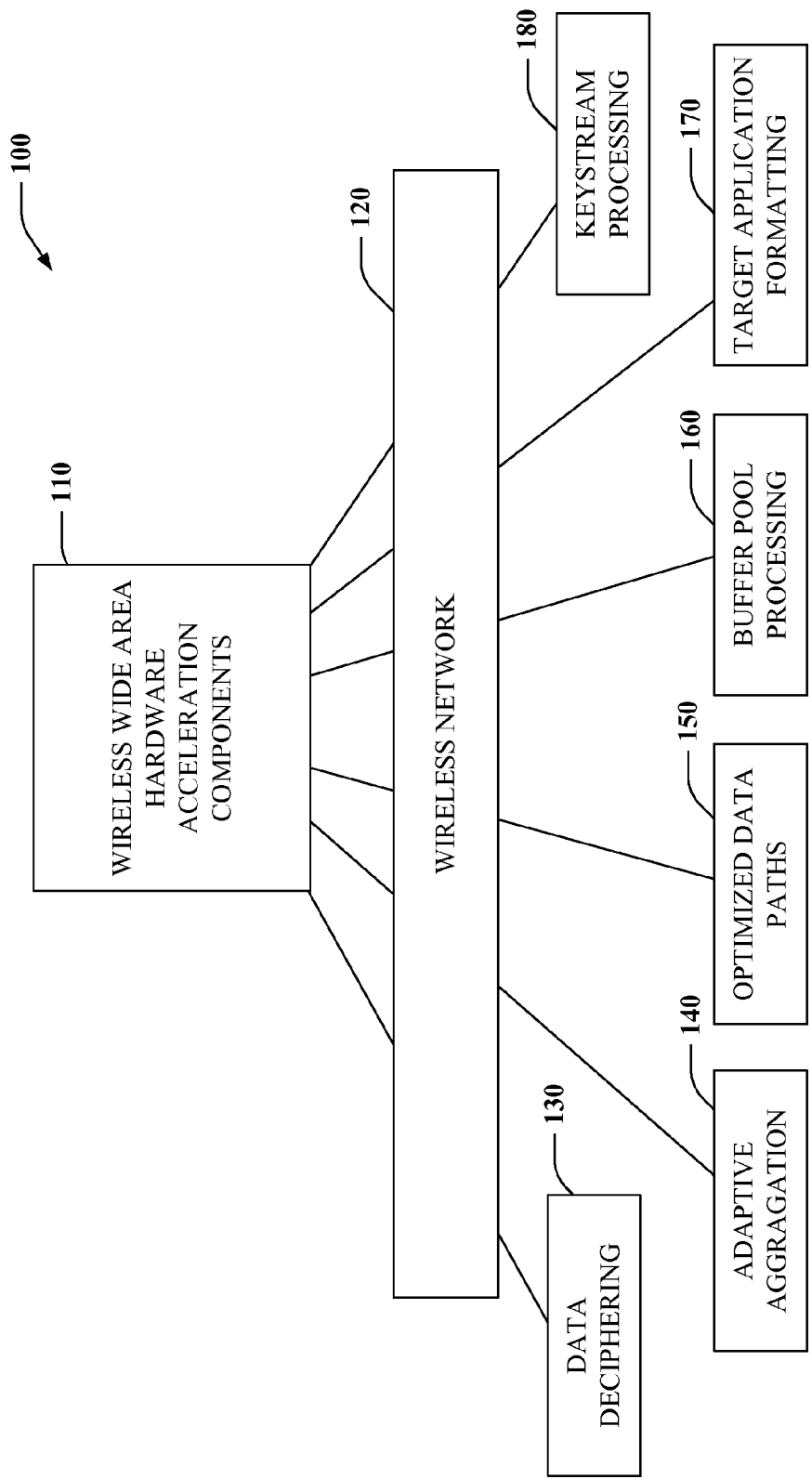
FIG. 1 is a high level block diagram of a system that provides hardware acceleration components for a wireless communications system.

Referring now to FIG. 1, a system 100 illustrates wireless wide area network (WWAN) acceleration components 110 that can be deployed across one or more components of a wireless network 120 in order to facilitate processing performance and mitigate hardware complexities. As shown, various components are provided that enable hardware performance to be increased in network components such as user equipment, mobile devices, and base stations, for example, that are described ion more detail below. A general overview of the acceleration components will be provided followed by more detailed descriptions in FIGS. 2-7 below.

In one aspect, internal processing such as data deciphering 130 is performed before copying results of the deciphering to external memory in order to minimize processing operations. This includes parameter deciphering which is described in more detail below. Another aspect includes adaptive or dynamic data aggregation and interrupt processing at 140 in order to facilitate processing performance. This includes monitoring thresholds to determine optimum times to interrupt a processor for further data processing activities. In another hardware acceleration aspect, data path processing optimization 150 is provided via different hardware paths, either where data deciphering is decoded in a buffer before moving to external memory, or by performing deciphering directly in external memory. At any given point the hardware path is dynamically selected depending on the specific scenario. In either case, hardware is simplified and processing performance enhanced by reducing the number of operations and logic involved.

In yet another aspect, buffer pool components 160 are provided that enable data processing to occur at less frequent intervals and/or at periods when the resident processor is not as busy thus saving performance bandwidth for busier processing times. In still yet another acceleration aspect, application processors prepare data at 170 in a format suitable by a destination processor or process. This mitigates the need for the destination processor to transform such data into a suitable processing format for the respective destination. Keystream processing components 180 are provided where various parameters and data values can be derived from other parameters rather than having to be regenerated anew each time. Such processing derivations further enhance performance of hardware accelerators. It is noted that data deciphering 130 is described in more detail with respect to FIG. 2, adaptive aggregation 140 is described in more detail with respect to FIG. 3, optimized path processing 150 is described in more detail with respect to FIG. 4, buffer pool processing 160 is described in more detail with respect to FIG. 5, application formatting 170 is described in more detail with respect to FIG. 6, and keystream processing 180 is described in more detail with respect to FIG. 7.

Before proceeding, a brief overview of the wireless network 120 and associated components (not shown) are provided. The system 100 includes one or more base stations (also referred to as a node, evolved node B-eNB, femto station, pico station, and so forth) which can be an entity capable of communication over the wireless network 120 to a second device (or devices). For instance, each device can be an access terminal (also referred to as terminal, user equipment, station or mobile device). The base stations can communicate to the device via downlink and receive data via uplink. Such designation as uplink and downlink is arbitrary as the device can also transmit data via downlink and receive data via uplink channels.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Referring now to FIGS. 2-7, wireless communications methodologies are illustrated. While, for purposes of simplicity of explanation, the methodologies (and other methodologies described herein) are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the process in FIGS. 3-5 improves the probability of handover messages being received by user equipment with minimum delay. This includes shorter stalls or delays during handover between nodes or devices, which can improve end user experience, especially with real-time delay sensitive services where handover outages are unacceptable.

Figure 2:
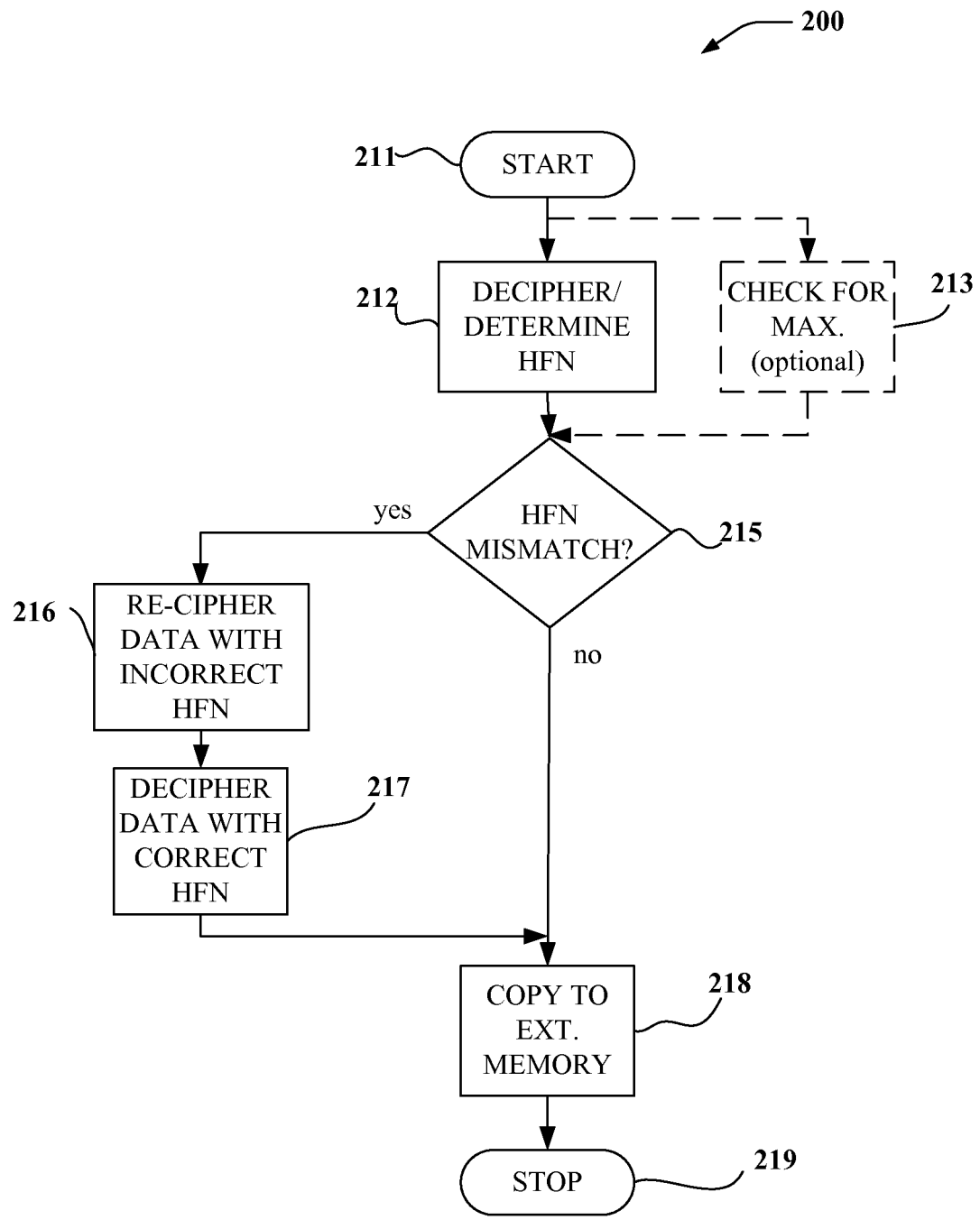
FIG. 2 is a flow diagram that illustrates data deciphering for a wireless system.

Referring to FIG. 2, a process 200 illustrates data deciphering for a wireless system. For Universal Mobile Telecommunications System/Long Term Evolution (UMTS/LTE) radio interface protocols, the deciphering function is specified as part of the radio link control (RLC) or even packet data convergence protocol (PDCP) protocols. Normally, it is desirable to implement the deciphering function at the output of the decoder, such that unciphered data can be copied into the external memory for processing in the higher layers. Otherwise, data could also be copied directly to external memory from the decoder, however then additional copies are needed to pass the data back to the deciphering hardware, and back to external memory again. An exemplary approach to address this is to decipher before copying to external memory and therefore save copy operations. However, this requires the hardware to reliably derive the deciphering parameters, otherwise deciphering will fail and the software will not be able to interpret any data after this point.

Two input parameters for deciphering a packet are: 1. The packet sequence number (which is signaled in the header of each packet) and 2. The hyper frame number (which is maintained internally, and updated based on the sequence number). The packet sequence number increases by one for each new data packet until a certain point (reaching the max sequence number), after which it restarts from zero (rollover). When this happens, the internally maintained hyper frame number (HFN) is increased by one. In normal conditions, this enables the reliable prediction of the HFN based on the sequence number, which could easily be implemented in hardware. However, in certain cases the HFN is difficult to predict because of packet retransmissions combined with handover scenarios where ciphering parameters can change. Resolving the HFN in these instances requires additional hardware complexity. However, without this additional complexity the hardware may use the wrong deciphering parameters, and data loss may occur. Worse yet, the hardware could potentially stay out of sync indefinitely, leading to RLC reset. One manner to correct this is to derive the deciphering parameters, specifically the HFN and perform deciphering before the copy to external memory, while facilitating the software to detect a HFN mismatch in the hardware and correct it when needed.

FIG. 2 illustrates an exemplary process 200 for hardware acceleration using early deciphering of data. In operation, after initialization 211 of the exemplary process 200, the HFN is detected at 212. The detection function 212 could be implemented either by having advanced logic in place for tracking the HFN, or optionally just check at 213 for a max number of consecutive packets with corrupted headers and data. The resulting HFN is tested at 215 for an HFN mismatch. If a mismatch or corrupted HFN is found, then exemplary process 200 re-ciphers the ciphered data with the incorrect HFN 216 and deciphers the reconstructed data with the correct HFN 217. Next, the exemplary process 200 copies the data to the external memory 218 and proceeds to use the new HFN from this point onwards. Finally, the exemplary process 200 would terminate at 219. By use of this method, data loss when encountering a HFN mismatch can be avoided. Further, the number of data copies by deciphering data before copy to external memory can be reduced, increasing throughput.

Figure 3:
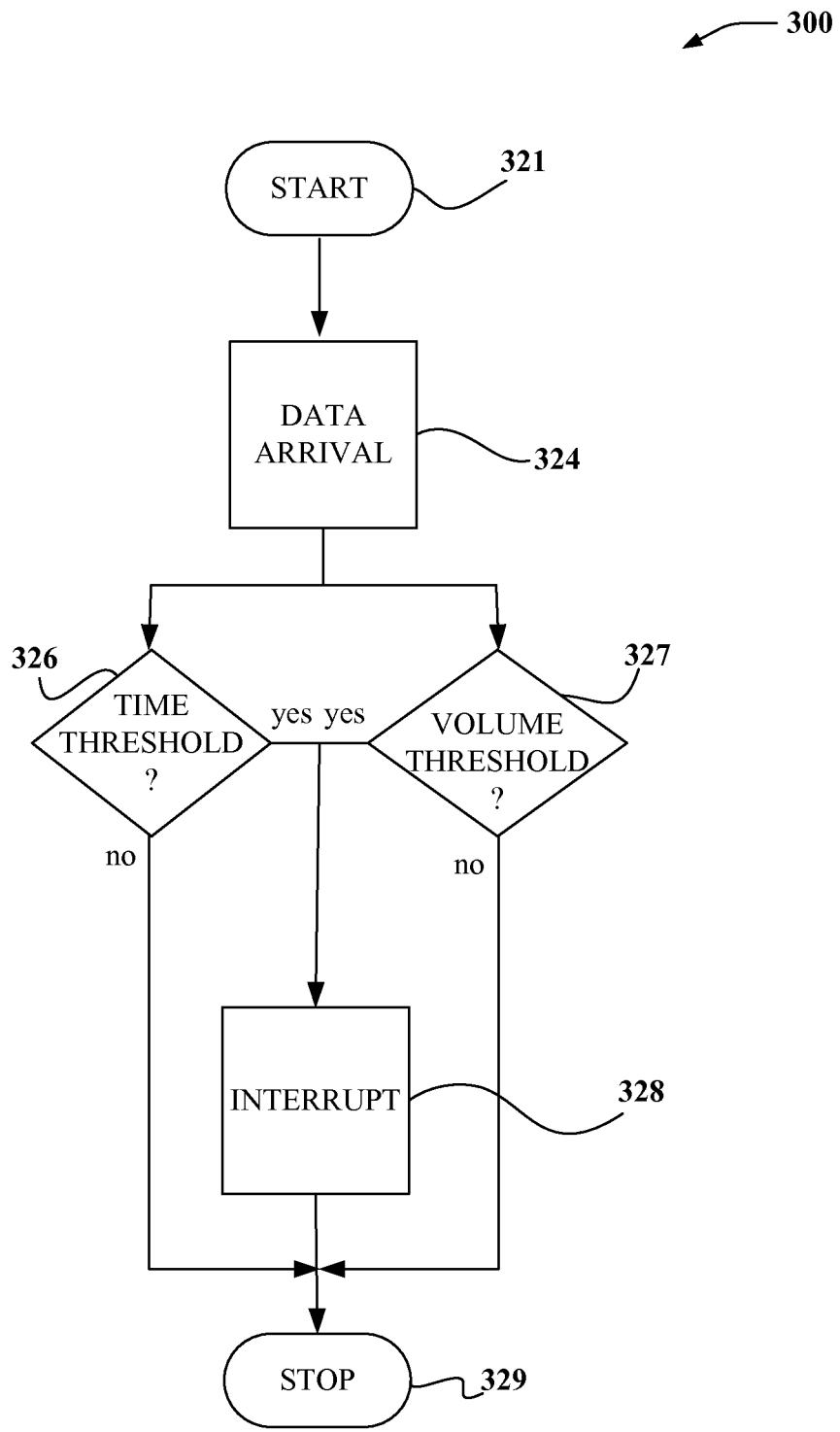
FIG. 3 is a flow diagram that illustrates adaptive aggregation for a wireless communications system.

FIG. 3 is a process 300 that illustrates adaptive aggregation for a wireless communications system. When implementing protocol acceleration in hardware, it is sometimes necessary to send frequent interrupts to the modem processor to quickly forward incoming data up the stack to limit the delay for delay sensitive services. On the other hand, interrupting the processor adds overhead (e.g., context switches in software) and reduces the available processing resources. One exemplary method to address this is to implement a dynamic aggregation of data.

FIG. 3 is a flow chart illustrating another exemplary process 300 for hardware acceleration using adaptive aggregation length and priority queues. In operation, after initialization 321, when data is arriving at 324, a threshold is tested. This threshold can be a time- and/or data volume based thresholds 326 and 327, respectively. When the time since the last time data was forwarded is expired exceeds a threshold 326, and if new data has arrived, an interrupt 328 to software can be triggered. Also, when the amount of data ready to be processed by software exceeds a second threshold 327, an interrupt 328 to software can be triggered. Otherwise, data can be accumulated without interrupting software, and the process is stopped at 329.

These thresholds 326 and 327 could be adjusted dynamically based on (but not limited to) the type of data that is processed, for example, based on quality of service (QoS) priorities, or whether data is signaling or user plane. For example, high priority data for real-time applications (e.g., VoIP, gaming) or signaling data could be processed in a separate queue given a lower aggregation threshold. Other user plane data without delay constraints could be processed in a separate queue with a higher aggregation threshold. In high data volume cases, the delay is usually not sensitive due to buffering delays elsewhere. Therefore, the measured amount of data (bytes/second) could be used to set the aggregation thresholds dynamically. The thresholds could also be adjusted based on available processing/bus bandwidth resources, other concurrently running applications, available battery life, and so forth. Therefore, by implementation of a time and/or volume threshold for incoming data, it is possible to reduce the number of software interrupts, hence increase available processing resources/lower MIPS and power consumption.

Figure 4:
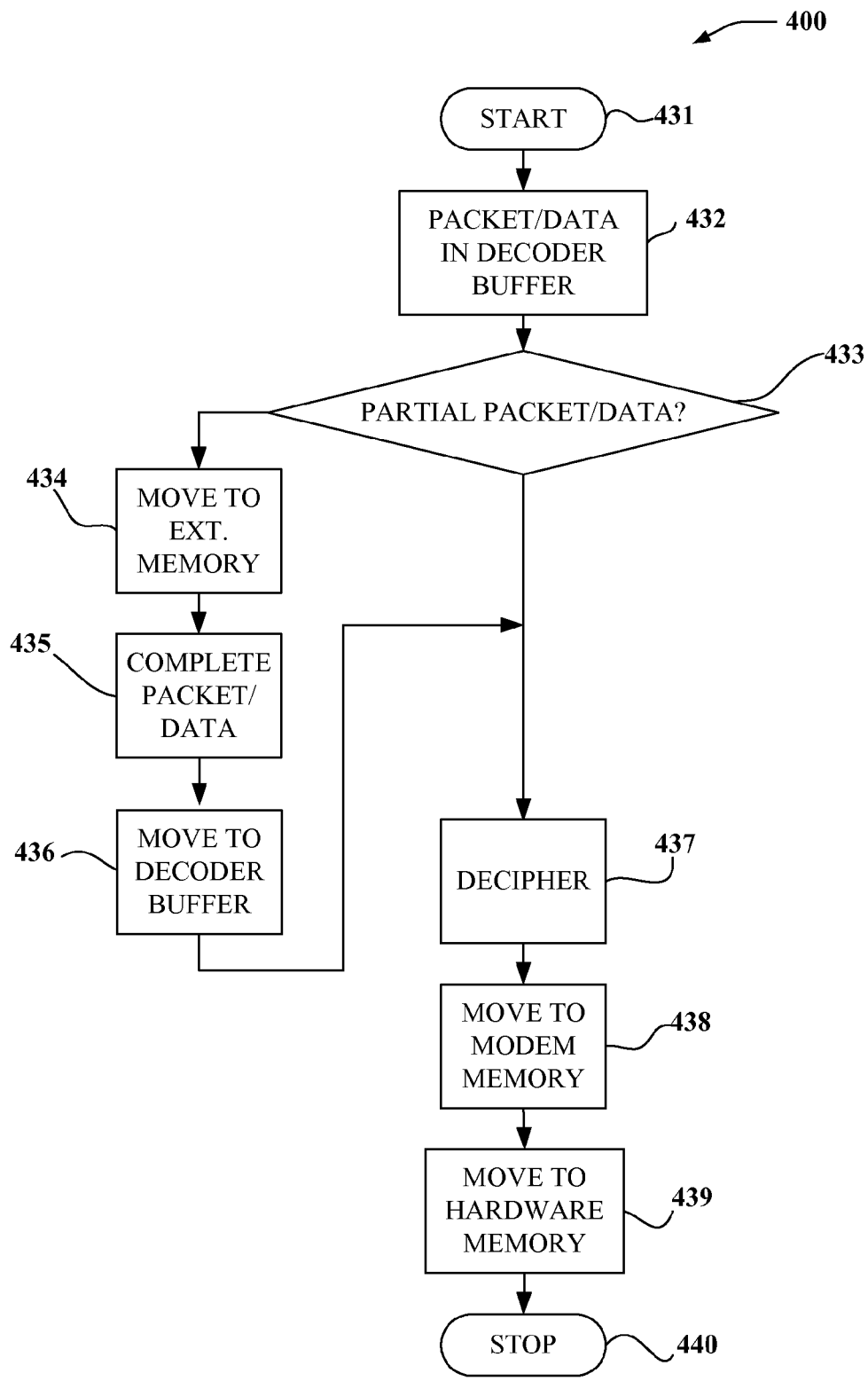
FIG. 4 is a flow diagram that illustrates optimized data path processing for a wireless communications system.

FIG. 4 is a process 400 that illustrates optimized data path processing for a wireless communications system. When implementing WWAN protocols such as LTE and wireless CDMA (WCDMA), there are certain functions such as ciphering/deciphering, HDLC framing, CRC checksum calculations, and protocol header insertion, for example, which lend themselves well to hardware acceleration. The straightforward approach is to perform these functions in their respective layers: cipher-/deciphering in RLC/PDCP, HDLC framing in PPP/data services layer, CRC checksum in IP or TCP layer, and so forth. However this is inefficient from a resource point of view, because each time data is moved between storage in external memory and the hardware accelerator, there will be an overhead cost in bus utilization (leaving less bus bandwidth available for other uses) and power consumption.

By grouping these functions together and performing them in a one-shot manner for example, bus activity can be reduced. In order to implement this, the nature of the WWAN protocol is to be taken into account. There are two fundamental approaches, hereafter denoted as option 1 and option 2.

For Option 1: In this option, data is deciphered directly when in the decoder output buffer, before being moved to external memory. However in certain cases, only a portion of a packet is received, in which case the packet cannot be deciphered. In that case the packet is to be moved to external memory, where it stays until the parts of the packet are received. At that point, the complete packet will be moved back to the hardware buffer for deciphering. The complete packets are then reassembled into higher layer packets. In the higher layers, the data may again be subject to hardware acceleration functions. For a data call to a tethered device (for example USB), this could be high-level data link control (HDLC) framing for PPP, header insertion for Ethernet, or CRC addition for native IP, and so forth. For embedded data call to an application in the application processor, this could be CRC calculation in IP and TCP layers, and so forth. Subsequently, the data is destined either for a memory location in the application processor for embedded applications, or for a tethered call. The software can implement an Internet Protocol (IP) based routing function to determine where the data is destined for. In either event, this causes the data to be moved. In view of this, efficiencies can be obtained by combining the data move operation with the hardware acceleration functions, such that the data is only moved once. In summary, data can be moved twice (except for partial packets)—once from the decoder buffer to the modem processor memory, and a second time from the modem processor memory to the applications processor memory or tethered device.

For Option 2: This option can fundamentally be seen as option 1 but with the deciphering being part of the second data move operation. This implies that data is moved directly to external memory from the decoder, before deciphering, which simplifies the logic in hardware to determine the ciphering parameters. When the data has been moved to external memory, the ciphering parameters can be determined in software itself. However, one drawback of this approach is that the IP routing function is implemented in hardware, because it may not be possible to filter the data while it is still ciphered. This requires the hardware to be programmable with a table of IP filters for routing purposes, which would require additional hardware complexity. Software may still be responsible for programming the routing tables correctly. A default routing entry can be setup to route packets as desired when packets are encountered which do not match any other entry.

Another aspect of Option 2 is to perform partial deciphering such that the IP/TCP headers are deciphered, in order to allow implementing the IP routing function in software. In order to minimize software processing overhead, the control structures for complete deciphering can be prepared along with the control structures for partial deciphering (in a separate memory location). The control structures for partial deciphering are submitted to hardware, and the partially deciphered IP/TCP headers are returned to software. These will subsequently be subject to the IP routing function in software. When the destination has been determined, the control structure for complete deciphering are updated with the destination based on the software IP routing, and the control structures for complete deciphering+IP routing can be submitted to hardware. Additional hardware acceleration functions (checksum, HDLC framing, and so forth) can be appended at this point as well. Therefore this method and system reduces data copies and thereby lower bus utilization and power consumption FIG. 4 relates to the data processing described above and illustrates an exemplary process 400 using reduced data moves. After initiation 431, the exemplary process 400 proceeds to acquire packet/data information 432, whereupon a test for partial packet/data information 433 is performed. If the packet/data is determined to be incomplete, the partial packet/data is moved to external memory 434 to await completion of the packet. After completion 435 of the packet/data, the exemplary process 400 moves the packet/data to the decode buffer 436 for deciphering at 437. If, however, at 433 the packet/data is determined to be complete, then the packet/data is deciphered at 437. As noted above for the enhanced version of Option 2, the deciphering 437 may only be a partial deciphering. After deciphering 437, the deciphered packet/data is first moved to modem memory 438 in accordance with conditions as described above. An additional second move 439 to memory on non-modem hardware is then performed in accordance with conditions as described above. As mentioned in Option 2, the deciphering 437 may occur after the second move 439. After completion of the hardware memory move 439, the exemplary process 400 terminates at 440, or optionally returns (not shown) to 432 for the next packet/data in the stream.

Figure 5:
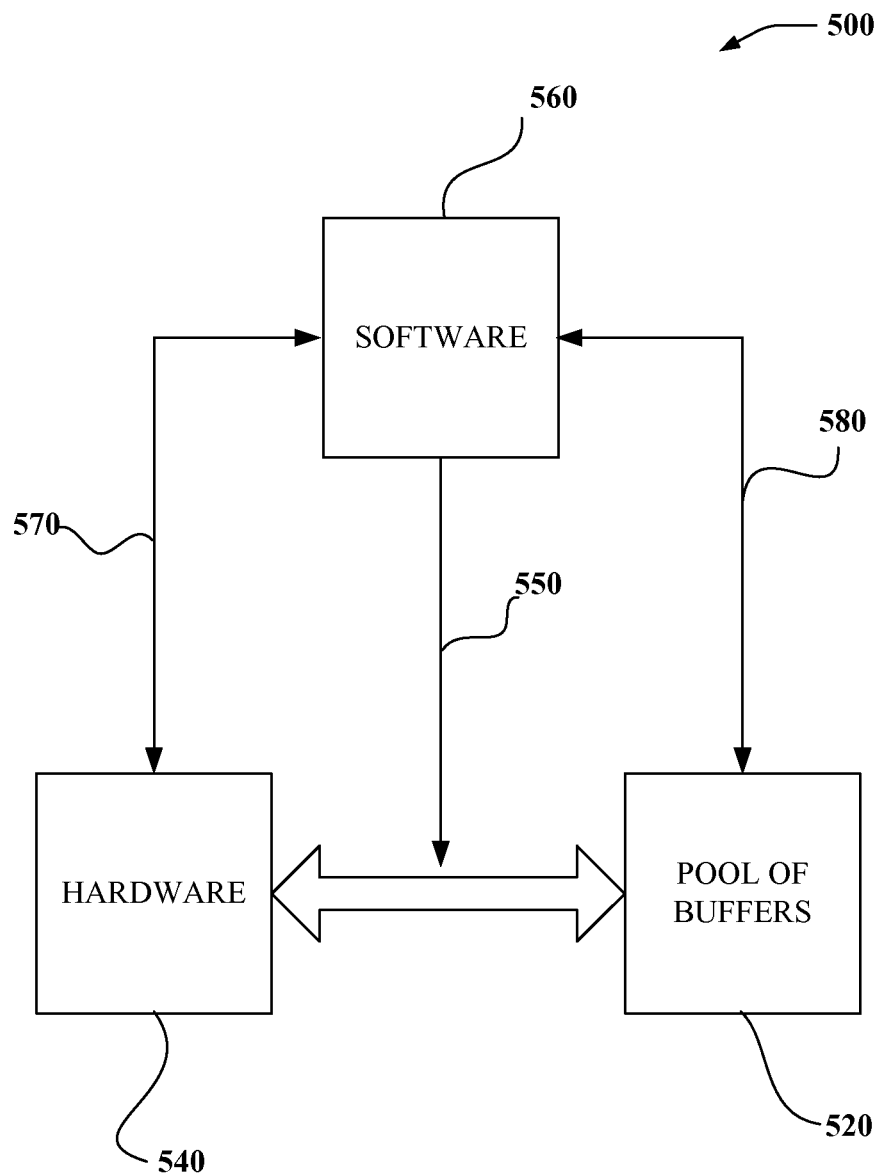
FIG. 5 is a flow diagram that illustrates buffer pool processing for a wireless communications system.

FIG. 5 is a process 500 that illustrates buffer pool processing for a wireless communications system. One manner of providing buffers for a hardware accelerator to write into is by preparing the buffers with each hardware task. However, this approach generally requires more software processing and may increase the critical timeline. A more efficient exemplary approach is to provide the buffers more infrequently and outside of the critical timeline.

FIG. 5 is a block diagram 500 illustrating an exemplary arrangement for hardware acceleration using a buffer pool mechanism. A dynamic pool of buffers 520 for use by hardware 540 is controlled by software 560. Access control 550 between the pool of buffers 520 and the hardware 540 is facilitated and/or moderated by the software 560. As discussed below, the pool of buffers 520 may be dynamically adjusted 580 by the software 560 according to hardware needs forwarded by status signals 570 from the hardware 540. Thresholds and software signals may also be used to control operation and size of the pool of buffers 520. In some aspects, the software 560 can provide the hardware 540 with the pool of buffers 520 to which the hardware 54 can write incoming data, which is sized such that it can span over multiple tasks. The hardware 540 can track how many of the buffers it has used already, and to which point it has filled up the most recent buffer. This information is then passed back to software 560 as status information 570 which is associated with the completion of a hardware task. The pool 520 can be replenished by various mechanisms, for example periodically, or based on a level mechanism that triggers a software interrupt when the amount of free space in the pool 520 falls below a threshold, at which point software 560 can replenish the pool 520. One major advantage is that this can happen at times when the processor is not very busy. Further, the frequency of refilling the pool 520 can be reduced by increasing the pool size.

When the hardware 540 moves the data into these buffers 520, there may be cases where cache inconsistencies arise because the hardware 540 stops writing data on a non cache-row aligned memory location. To avoid any potential cache pollution issues, when the hardware 540 is done processing a certain amount of data, it can automatically move to the next cache aligned memory location and start writing from that point. Therefore, software 560 does not have to perform extra cache maintenance to avoid cache pollution issues. Consequently, it is possible to reduce software processing for preparing output buffers for hardware acceleration tasks.

Figure 6:
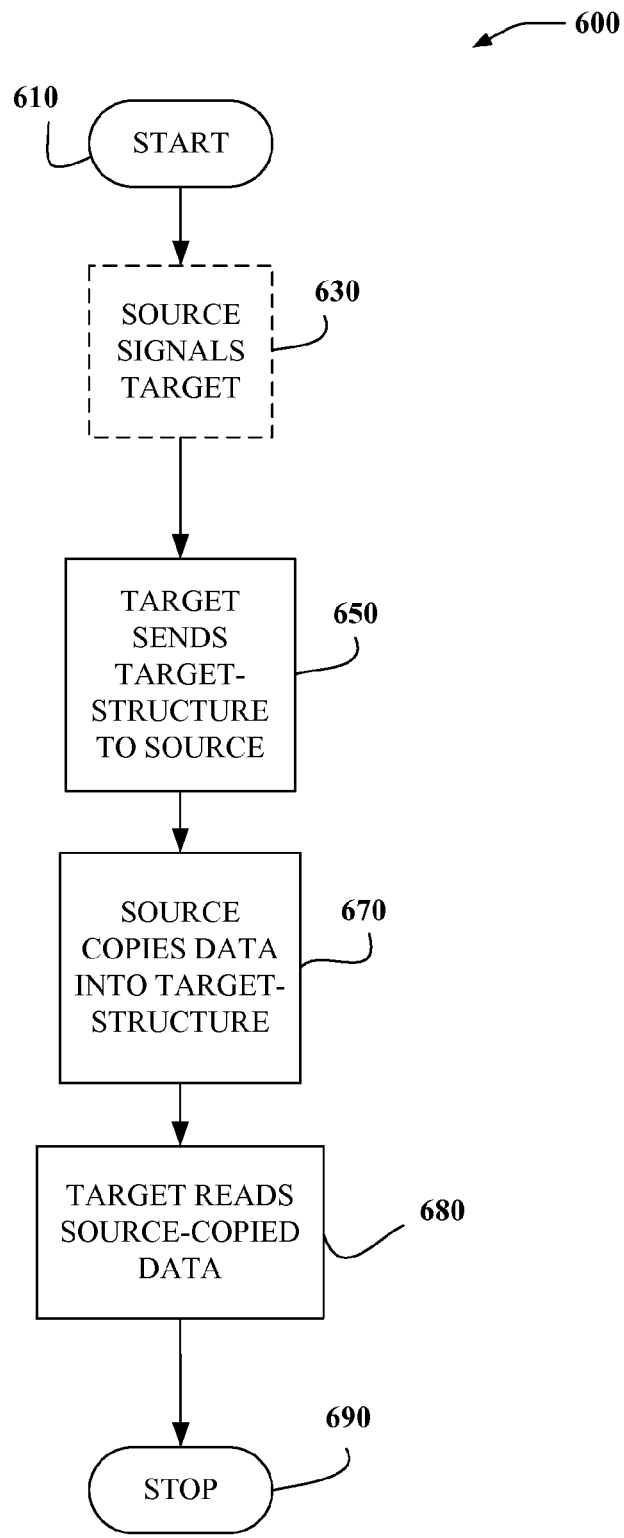
FIG. 6 is a flow diagram that illustrates application formatting for a wireless communications system.

FIG. 6 is a process 600 that illustrates application formatting for a wireless communications system. In a conventional design where data is passed from one entity to another, a temporary buffer would be provided by the target entity to store incoming data (e.g. via a shared memory interface). In this context, the "entity" can be either a processor or a hardware accelerator block. The source entity would copy the data into this location and signal the target, which then subsequently copies the data again into a data structure readable by the target application. In order to avoid the duplicate copies, one exemplary approach is to have the target entity directly pass the data structure readable by the application to the source entity. Therefore, one copy can be avoided.

FIG. 6 illustrates another exemplary process 600 for hardware acceleration with the target entity directly passing the data structure. The exemplary process 600 begins at 610 with initialization. In some aspects, after initialization the source may signal the target of data to be sent to the target. In other aspects, the target may signal the source that it is to receive data. Accordingly, at 630 is illustrated as an optional step, which may or may not be optional, depending on the implementation. The exemplary process next continues to s650 where the target sends target-specific structure(s) or forms to the source. After receipt, the source copies at 670 its data into the target-provided format. Next, after notification, the target reads the source-copied data 680 now being formatted in a form that is readily used by the target. After reading the source-copied data, the exemplary process may terminate at 690. By use of this exemplary process 600, the typical additional copy when transferring data between two entities can be eliminated, thus reducing bus bandwidth and power consumption.

One particular example of this method is the Network Driver Interface Specification (NDIS) driver which is used when interfacing with a commercially available operating system, which expects data to be copied into buffers each having a header of a certain format. By using the exemplary process 600, the target entity (application processor) can directly pass the NDIS buffers to the source entity (protocol hardware accelerator). The source entity copies the data, and also fills in the NDIS header fields such as start address and length, then signals back to the target entity that it is done. Now the target doesn't have to perform additional copies, but now fills out the remaining NDIS header fields.

Figure 7:
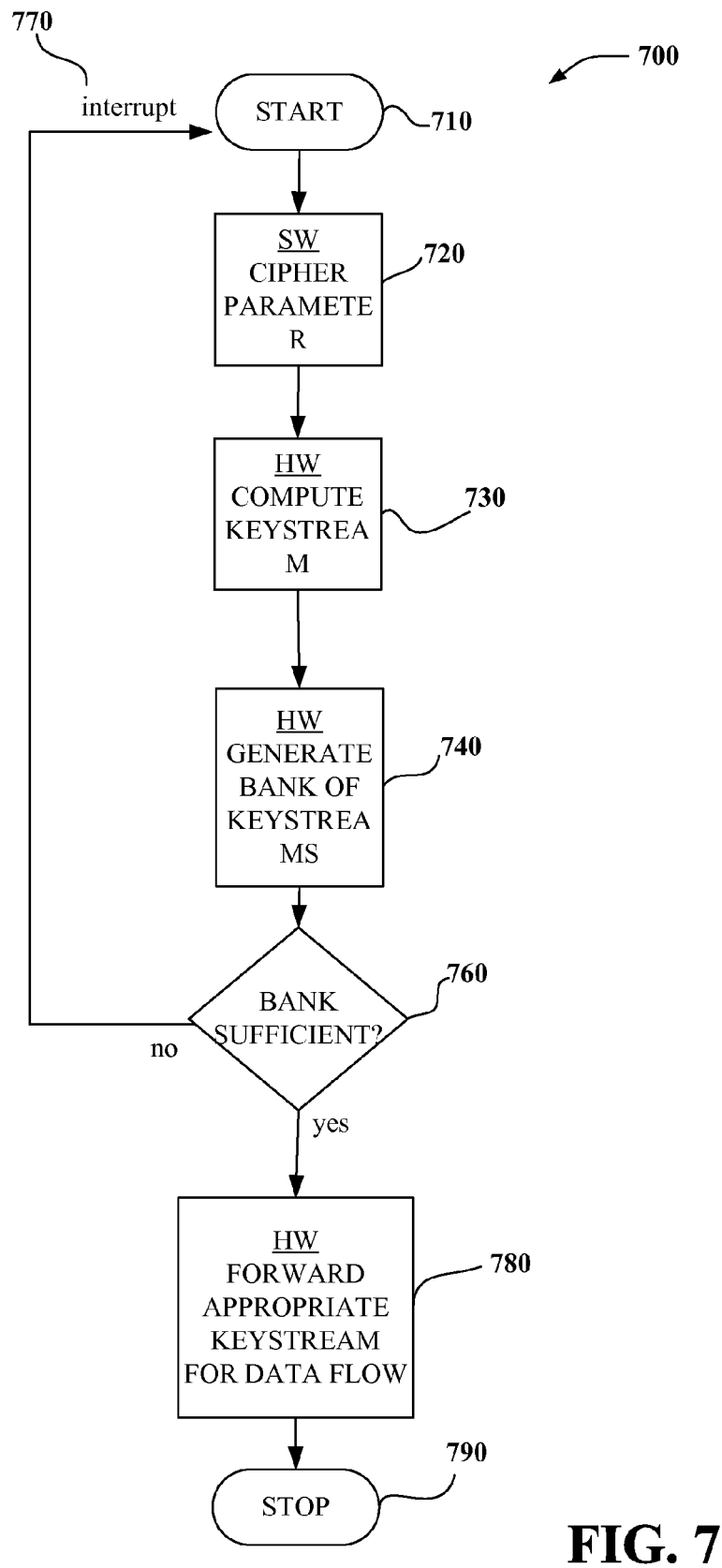
FIG. 7 is a flow diagram that illustrates keystream processing for a wireless communications system.

FIG. 7 is a process 700 that illustrates keystream processing for a wireless communications system. In general, deciphering consists of generating a keystream based on the decipher parameters, and subsequently XOR-ing (exclusive-OR-ing) the keystream with the ciphered protocol data units (PDUs). In the conventional approach, ciphered PDUs are first moved from external memory to hardware memory for deciphering, and then moved back to external memory again. Hence data is moved twice in that case. An exemplary approach to improving this process is to have software program the ciphering parameters to hardware, and have the hardware pre-compute only the keystreams for a number of packets in advance. This can be done efficiently, since software just has to provide the cipher parameters for the first PDU, from which the hardware can automatically derive the cipher parameters for all the subsequent data PDUs. Hence the software overhead of programming cipher parameters reduces to almost zero. When software needs to decipher a received data PDU, it picks up the correct keystream, and performs the XOR operation with the data PDUs.

FIG. 7 illustrates another exemplary process 700 for hardware acceleration using a Keystream bank generated by hardware. The exemplary process 700, after initialization 710, proceeds with the software forwarding a cipher parameter 720 to the hardware for keystream computation 730. The hardware may generate a bank of pre-computed keystreams which can be stored in low-latency/hardware memory or even external memory. It may be desirable to store separate keystreams for different data flows which can have different ciphering parameters.

In some aspects, it may be desirable to have a mechanism to ensure that there are enough keystreams, i.e., the bank of keystreams is to be replenished at regular intervals. The benefit is that this doesn't have to be done very often, if the keystream bank is sufficiently large. The mechanism could be implemented by means 760 of a timer, or by means 760 of a threshold. For example, when the means 760 indicates the number of available keystreams has dropped below a threshold, or a time limit has been exceeded, the means 760 can send an interrupt 770 to software to program hardware to generate new keystreams. If the keystream bank 760 is sufficient, the appropriate keystream from the hardware can be forwarded to the appropriate processor/buffer for data flow at 778. In some aspects, the keystream may be forwarded for data flow 780 before the bank testing means 760. After the forwarding of the keystream 780, the exemplary process 700 may terminate at 790.

It should be noted that the bank of keystreams should be flushed out in case of ciphering parameter reconfiguration, and consequently a new set of keystreams would need to be generated. One application where this is particularly suitable is for data streams with small packet sizes (low data rate, real-time services such as (e.g., VoIP, gaming), where the length of the keystream for each PDU is small, which helps reduce the memory requirement for storing keystreams. This exemplary approach can also be used for partial deciphering, for example, to allow deciphering of just the IP/TCP header to enable software to perform IP routing without deciphering the entire packet payload. This case is useful since partial deciphering allows for smaller keystreams to be stored, in which case the hardware memory requirement is relatively low. Therefore, this exemplary process 700 can reduce the delay for performing deciphering for delay sensitive applications. Further, it can also reduce the software processing to prepare decipher parameters (at the expense of additional processing for XOR operation). Additionally, it can reduce the bus bandwidth (1 copy instead of 2 copies with more conventional hardware approach)

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

In one aspect, a method of deciphering packetized data in a telecommunications signal with a hyper framer number (HFN) is provided. The method includes determining the HFN, testing for a mismatched HFN, wherein if a mismatched HFN is detected, reconstructing data that was deciphered with the mismatched HFN, deciphering the data using a correct HFN, and copying the deciphered data to an external memory after the correct HFN is utilized, where a reduction in copying data to the external memory is achieved when a mismatched HFN is detected. This includes deriving one or more deciphering parameters before copying the deciphered data and deriving a packet sequence number in addition to the HFN.

In another aspect, a processor capable of deciphering packetized data in a telecommunications signal with a hyper framer number (HFN) is provided. The processor includes instructions for determining the HFN, testing for a mismatched HFN, wherein if a mismatched HFN is found, reconstructing data that was deciphered with the mismatched HFN, deciphering the data using a correct HFN, and copying the deciphered data to an external memory after the correct HFN is utilized, where a reduction in copying data to the external memory is achieved when a mismatched HFN is detected.

In another aspect, a computer readable medium includes instructions for deciphering packetized data in a telecommunications signal with a hyper framer number (HFN). This includes instructions for determining the HFN, testing for a mismatched HFN, wherein if a mismatched HFN is found, reconstructing data that was deciphered with the mismatched HFN, deciphering the data using a correct HFN; and copying the deciphered data to an external memory after the correct HFN is utilized, where a reduction in copying data to the external memory is achieved when a mismatched HFN is detected.

In yet another aspect, a method of increasing the performance of a telecommunications device by managing interrupts to its modem processor while processing packetized data is provided. This includes receiving packetized data, storing at least one of a time and data volume-based threshold with respect to the received packetized data, initiating a software interrupt to the modem processor when the packetized data ready to be processed by software exceeds at least one of the time and data volume-based thresholds, and accumulating the packetized data if no interrupt is initiated, and adjusting at least the time and data volume-based thresholds, in order to reduce frequency of interrupts. The method includes adjusting thresholds based on quality of service, on priority, on processing bandwidth, on bus activity, or available battery life.

In another aspect, a processor capable of increasing the performance of a telecommunications device by managing interrupts to its modem processor while processing packetized data is provided. The process includes instructions for receiving packetized data, storing at least one of a time and data thresholds with respect to the received packetized data, and initiating a software interrupt to the modem processor when the packetized data ready to be processed by software exceeds at least one of the time and data thresholds; and accumulating the packetized data if no interrupt is initiated, where adjusting at least the time and data thresholds, frequency of interrupts are reduced.

In another aspect, a machine readable medium containing instructions for increasing the performance of a telecommunications device by managing interrupts to its modem processor while processing packetized data is provided. The medium includes instructions for receiving packetized data, storing at least one of a time and data volume-based threshold with respect to the received packetized data, initiating a software interrupt to the modem processor when the packetized data ready to be processed by software exceeds at least one of the time and data volume-based thresholds, and accumulating the packetized data if no interrupt is initiated, where adjusting at least the time and data volume-based thresholds, frequency of interrupts are reduced.

In another aspect, a method of obtaining efficiencies in processing of functions in a telecommunications device by grouping functions germane to telecommunications processing of packetized data is provided. The method includes grouping functions relating to at least one of ciphering, deciphering, high-level data link control (HDLC) framing, checksum calculations, and protocol header insertion; and performing the functions as a group, where bus activity is reduced as compared to performing the functions on a non-group basis, where grouping enables a reduced move of data across hardware in the telecommunications device. Two moves of data are employed for performing the group or a function of at least one of ciphering and deciphering is performed after a first move of data. Partial deciphering for Internet Protocol/Transport Control (IP/TCP) headers are performed after the first move of data.

In anther aspect, a processor capable of obtaining efficiencies in processing of functions in a telecommunications device by grouping functions germane to telecommunications processing of packetized data, capable of executing instructions for: grouping functions relating to at least one of ciphering, deciphering, framing, checksum calculations, and protocol header insertion; and performing the functions as a group, where bus activity is reduced as compared to performing the functions on a non-group basis.

In another aspect, a machine readable medium containing instructions for obtaining efficiencies in processing of functions in a telecommunications device by grouping functions germane to telecommunications processing of packetized data, comprising instructions for grouping functions relating to at least one of ciphering, deciphering, framing, checksum calculations, and protocol header insertion; and performing the functions in group, where bus activity is reduced as compared to performing the functions on a non-group basis.

In another aspect, a method of providing buffers for a hardware accelerator in a telecommunications device for packetized data includes: providing a dynamic pool of buffers for use by the hardware accelerator, where access to the pool of buffers is controlled by software in the telecommunications device, where the software dynamically adjusts the pool of buffers according to hardware needs indicated by at least one of status signals from the hardware and threshold information on the pool of buffers, where buffers in the pool are replenished via software control. The status signals are associated with an interrupt that is timed during reduced processor activities.

In another aspect, a processor capable providing buffers for a hardware accelerator in telecommunications device for packetized data, capable of executing instructions for: providing a dynamic pool of buffers for use by the hardware accelerator, where access to the pool of buffers is controlled by software in the telecommunications device, where the software dynamically adjusts the pool of buffers according to hardware needs indicated by at least one of status signals from the hardware and threshold information on the pool of buffers, where buffers in the pool are replenished via software control.

In yet another aspect, a machine readable medium containing instructions for a hardware accelerator in a telecommunications device for packetized data, comprising instructions for: providing a dynamic pool of buffers for use by the hardware accelerator, where access to the pool of buffers is controlled by software in the telecommunications device, where the software dynamically adjusts the pool of buffers according to hardware needs indicated by at least one of status signals from the hardware and threshold information on the pool of buffers, where buffers in the pool are replenished via software control.

In another aspect, a method for reducing duplicate copies of data during read and write operations between target and source modules in a telecommunications device for packetized data includes: signaling a target module by a source module in the telecommunications device that data is to be copied to the target module; sending a target-specific structure by the target module to the source module; receiving the target-specific structure by the source module; populating data into the target-specific structure by the source module; and receiving the target-specific populated data by the target module, where one copy of data having the target-specific structure is created. The target-specific structure is associated with a network driver interface specification (NDIS), for example.

In another aspect, a processor capable of reducing duplicate copies of data during read and write operations between target and source modules in a telecommunications device for packetized data, capable of executing instructions for: signaling a target module by a source module in the telecommunications device that data is to be copied to the target module; sending a target-specific structure by the target module to the source module; receiving the target-specific structure by the source module; populating data into the target-specific structure by the source module; and receiving the target-specific populated data by the target module, where one copy of data having the target-specific structure is created.

In another aspect, a computer program product having a computer readable medium containing code for reducing duplicate copies of data during read and write operations between target and source modules in a telecommunications device for packetized data, including code for: causing a computer to signal a target module by a source module in the telecommunications device that data is to be copied to the target module; sending a target-specific structure by the target module to the source module; receiving the target-specific structure by the source module; populating data into the target-specific structure by the source module; and receiving the target-specific populated data by the target module, where one copy of data having the target-specific structure is created.

In another aspect, a method of reducing data moves for a keystream generation in a telecommunications device, includes: programming ciphering parameters to hardware; pre-computing keystreams for a number of packets in advance by the hardware; storing the pre-computed keystreams in a bank; and providing a suitable keystream for data flow to software, where the bank of keystreams is tested for keystream sufficiency when a keystream is requested by software, where processing overhead to program additional keystreams is minimized by use of the pre-computed keystreams. The ciphered parameters are associated with protocol data units.

In another aspect, a processor capable of reducing data moves for a keystream generation in a telecommunications device, includes executing instructions for: programming ciphering parameters to hardware; pre-computing keystreams for a number of packets in advance by the hardware; storing the pre-computed keystreams in a bank; and providing a suitable keystream for data flow to software, where the bank of keystreams is tested for keystream sufficiency when a keystream is requested by software, where processing overhead to program additional keystreams is minimized by use of the pre-computed keystreams.

In another aspect, a machine readable medium containing instructions for reducing data moves for a keystream generation in a telecommunications device, comprising instructions for: programming ciphering parameters to hardware; pre-computing keystreams for a number of packets in advance by the hardware; storing the pre-computed keystreams in a bank; and providing a suitable keystream for data flow to software, where the bank of keystreams is tested for keystream sufficiency when a keystream is requested by software, where processing overhead to program additional keystreams is minimized by use of the pre-computed keystreams.

Figure 8:
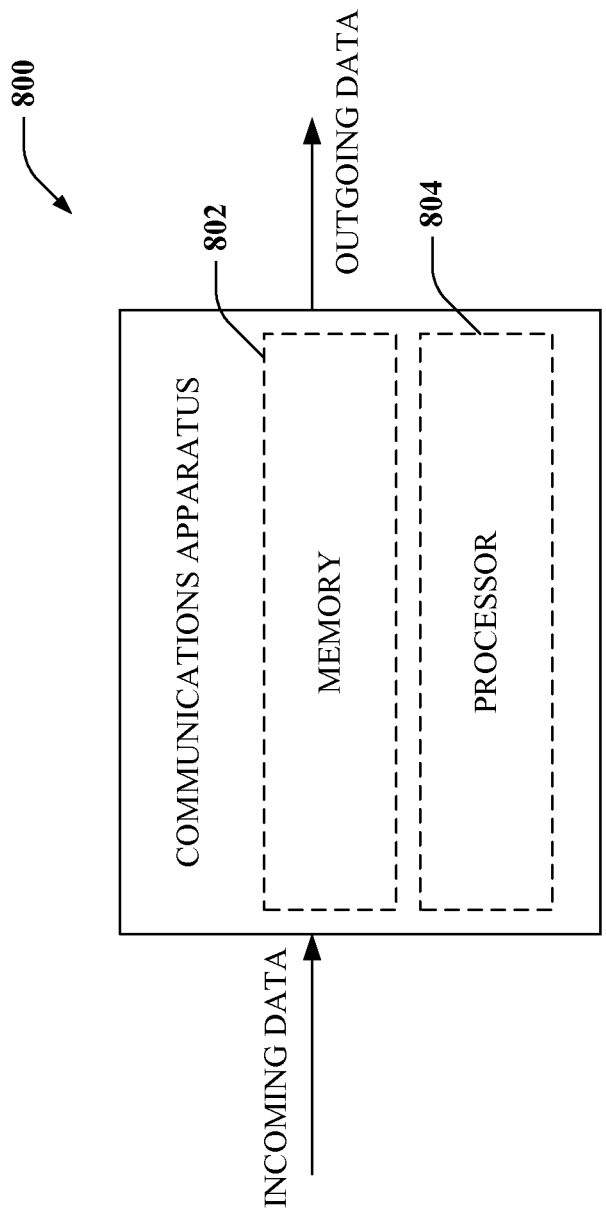
FIG. 8 illustrates an example communications apparatus that employs a wireless burst size processing.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
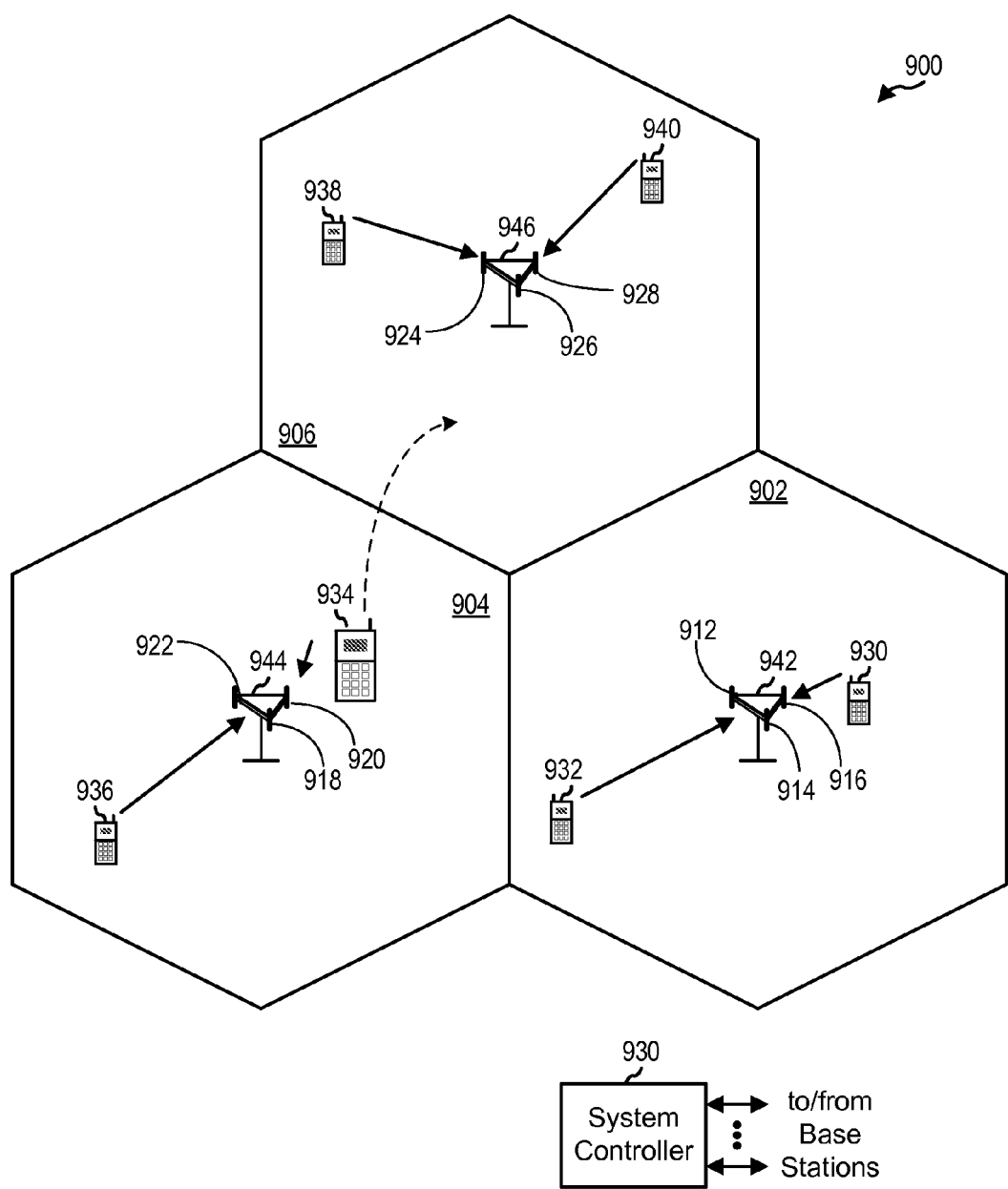
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
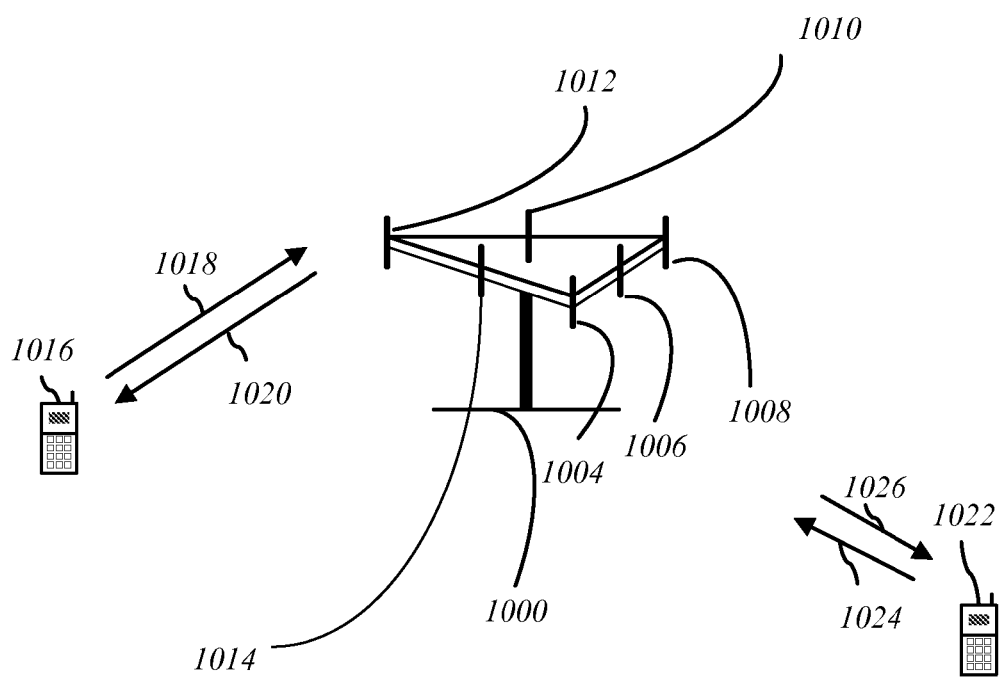
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
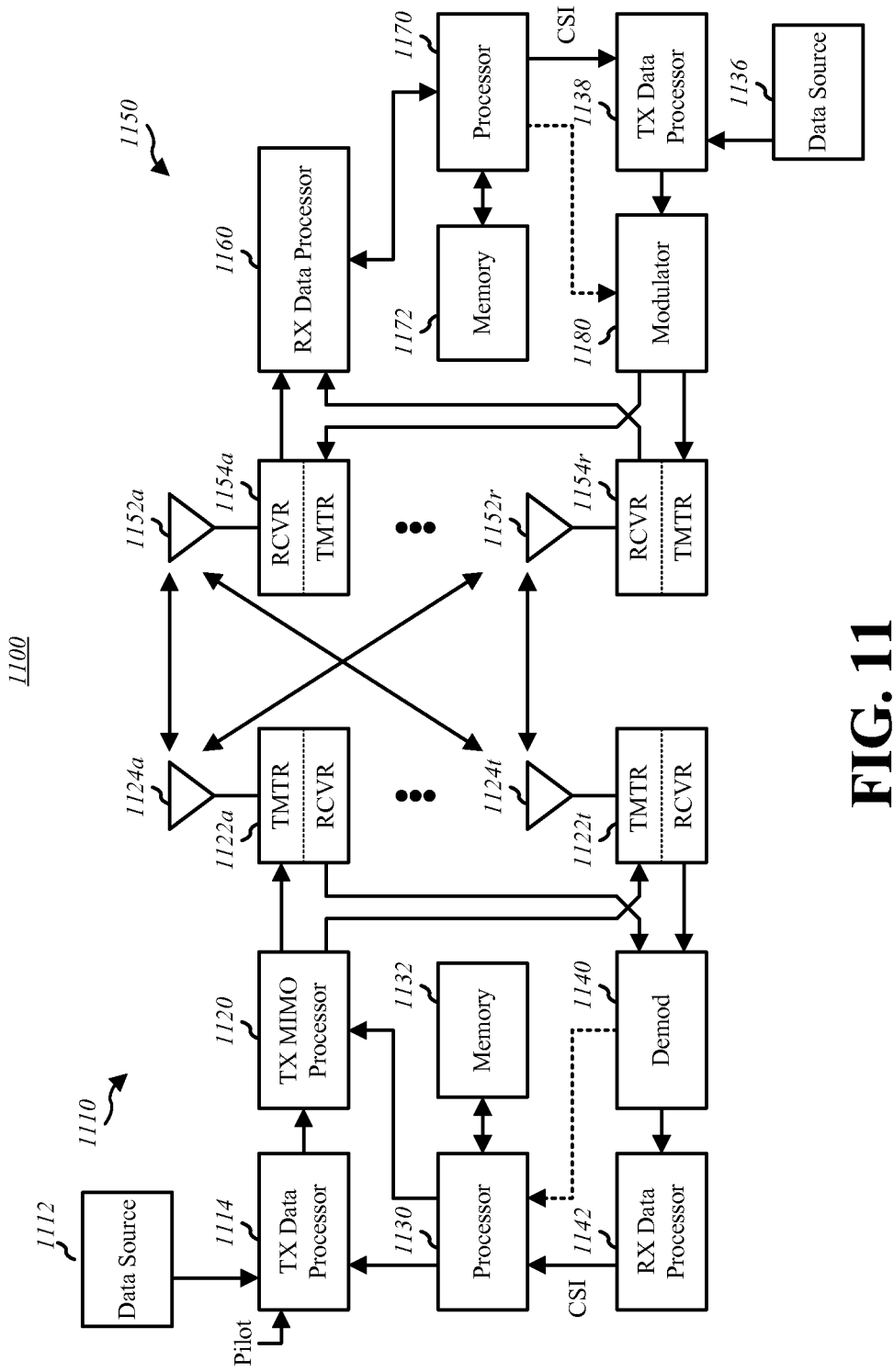

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

Figure 12:
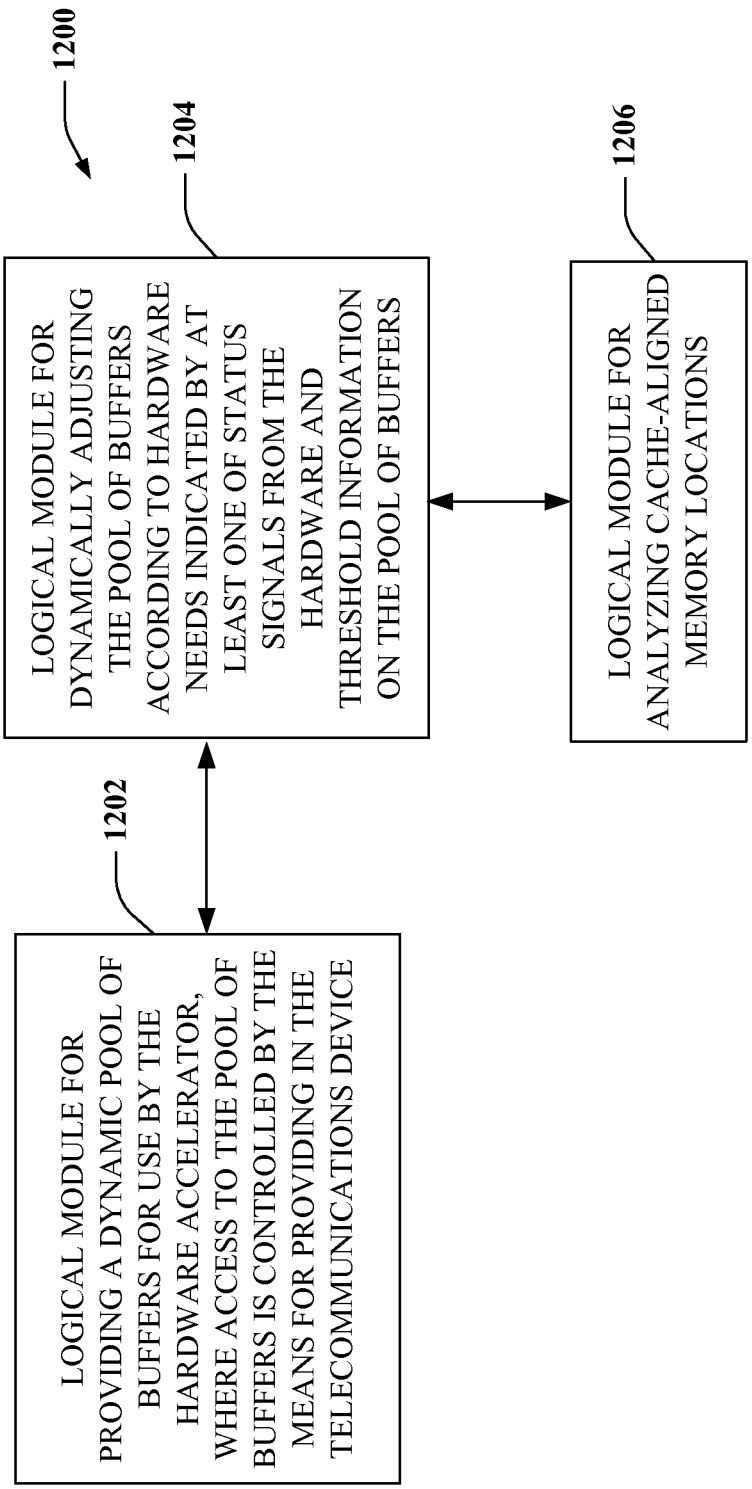
FIG. 12 illustrates an example logical module for acceleration processing.

Turning now to FIG. 12, a system is provided that relates to wireless signal processing. The systems are represented as a series of interrelated functional blocks, which can represent functions implemented by a processor, software, hardware, firmware, or any suitable combination thereof. The system includes an apparatus capable providing buffers for a hardware accelerator in a telecommunications device for packetized data.

Referring to FIG. 12, a wireless communication system 1200 is provided. The system 1200 includes a logical module 1202 or means for providing a dynamic pool of buffers for use by the hardware accelerator, where access to the pool of buffers is controlled by the means for providing in the telecommunications device. This includes a logical module 1204 or means for dynamically adjusting the pool of buffers according to hardware needs indicated by at least one of status signals from the hardware and threshold information on the pool of buffers, where buffers in the pool are replenished via the means for providing. The system 1200 can also include a logical module 1206 or means for analyzing cache-aligned memory locations.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of deciphering packetized data in a telecommunications signal with a hyper frame number, comprising:
   determining the hyper frame number;
   testing for a mismatched hyper frame number, wherein if a mismatched hyper frame number is detected, reconstructing data that was deciphered with the mismatched hyper frame number;
   deciphering the data using a correct hyper frame number; and
   copying the deciphered data to an external memory after the correct hyper frame number is utilized, where a reduction in copying data to the external memory is achieved when a mismatched hyper frame number is detected.

2. The method of claim 1, further comprising deriving one or more deciphering parameters before copying the deciphered data.

3. The method of claim 2, further comprising deriving a packet sequence number in addition to the hyper frame number.

4. A processor configured to decipher packetized data in a telecommunications signal with a hyper frame number, and configured to execute instructions for:
   determining the hyper frame number;
   testing for a mismatched hyper frame number, wherein if a mismatched hyper frame number is found, reconstructing data that was deciphered with the mismatched hyper frame number;
   deciphering the data using a correct hyper frame number; and
   copying the deciphered data to an external memory after the correct hyper frame number is utilized, where a reduction in copying data to the external memory is achieved when a mismatched hyper frame number is detected.

5. The processor of claim 4, further comprising deriving a packet sequence number in addition to the hyper frame number.

6. A computer program product, comprising:
   a non-transitory computer readable medium that includes code for deciphering packetized data in a telecommunications signal with a hyper frame number, the code comprising:
   code for causing a computer to determine the hyper frame number;
   code for causing a computer to test for a mismatched hyper frame number, wherein if a mismatched hyper frame number is found;
   code for causing a computer to reconstruct data that was deciphered with the mismatched hyper frame number; and
   code for causing a computer to decipher the data using a correct hyper frame number; and
   code for causing a computer to copy the deciphered data to an external memory after the correct hyper frame number is utilized, where a reduction in copying data to the external memory is achieved when a mismatched hyper frame number is detected.

7. The computer program product of claim 6, the non-transitory computer readable medium further comprising code for causing a computer to derive a packet sequence number in addition to the hyper frame number.

8. An apparatus configured to decipher packetized data in a telecommunications signal with a hyper frame number, comprising:
   means for determining the hyper frame number;
   means for testing for a mismatched hyper frame number, wherein if a mismatched hyper frame number is detected, means for reconstructing data that was deciphered with the mismatched hyper frame number;
   means for deciphering the data using a correct hyper frame number; and
   means for copying the deciphered data to an external memory after the correct hyper frame number is utilized, where a reduction in copying data to the external memory is achieved when a mismatched hyper frame number is detected.

9. The apparatus of claim 8, further comprising means for deriving one or more deciphering parameters before copying the deciphered data.

10. The apparatus of claim 8, further comprising means for deriving a packet sequence number in addition to the hyper frame number.

* * * * *